United States Patent Office 3,424,755
Patented Jan. 28, 1969

3,424,755
4-PIPERIDINE-P-FLUOROBUTYROPHENONES AND RELATED COMPOUNDS
Rolf Denss, 43 Schutzenmattstrasse, and Hugo Rye, 5 Rosentalstrasse, both of Basel, Switzerland, and Daniel A. Prins, 18 Burkenstrasse, Oberwil, Basel - Land, Switzerland
No Drawing. Continuation-in-part of application Ser. No. 438,047, Mar. 8, 1965. This application July 18, 1966, Ser. No. 565,753
Claims priority, application Switzerland, Mar. 9, 1964, 2,994/64; July 26, 1965, 10,444/65; June 15, 1966, 8,670/66
U.S. Cl. 260—293.4        20 Claims
Int. Cl. A61k 25/00; C07d 99/04, 99/06

ABSTRACT OF THE DISCLOSURE

The compounds are of the class of piperidino alkyl phenones and possess sedative, muscle relaxing, analgesic and anorexogenic properties. Illustrative embodiments are 1 - [4' - (p - fluorophenyl) - 4' - oxobutyl - (1')] - 4,4-ethylenedioxy piperidine and 4-(2-methyl-1,5-dioxa-9-azaspiro[5,5]undec - 9 - yl) - 4' - isopropylbutyrophenone. The products are prepared, for example, by treating a piperidine with a reactive ester of a benzoylhydrocarbinol.

This application is a continuation-in-part of our copending patent application Ser. No. 438,047 filed Mar. 8, 1965, now abandoned.

This invention relates to new piperidine derivatives and homologs thereof which have valuable pharmacological properties, processes for the production of these compounds, pharmaceutical agents containing these compounds as active ingredients and also methods of applying them in the treatment of various types of ill-health.

It has surprisingly been found that novel, basically substituted arylalkyl ketones of the formula

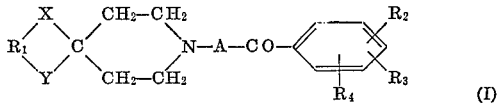

(I)

wherein

X and Y independently of each other represent oxygen or sulfur,
$R_1$ represents a divalent hydrocarbon radical having from 2 to 11 carbon atoms, which radical links X and Y by way of from 2 to 4 carbon atoms, and has no unsaturated bonds at the two terminal carbon atoms, and
$R_2$, $R_3$ and $R_4$ independently of each other represent hydrogen, lower alkyl or lower alkoxy radicals or chlorine atoms, and when $R_4$ is hydrogen, $R_2$ and $R_3$ also represent the methylenedioxy radical, and
A represents a straight-chain or branched alkylidene or alkylene radical having at most 4 carbon atoms, and their addition salts with inorganic and organic acids have sedative, muscle relaxing, analgesic and appetite inhibitory action and are suitable, in particular, for the treatment of states of tension and agitation of various origin and also for the relief and removal of pain. Compounds in which at least one of the symbols X and Y represents sulfur have a particularly marked analgesic action.

In the compounds of general Formula I and the starting materials used therefor which are mentioned below, the divalent hydrocarbon radical $R_1$ represents, e.g. the ethylene, propylene, 1,2-dimethyl-ethylene, trimethylene, 1-methyl-trimethylene, 2-methyl-trimethylene, 1,3-dimethyl-trimethylene, 2,2-dimethyl-trimethylene, 2,2-diethyl-trimethylene, tetramethylene, 1,4-dimethyl-tetramethylene, 2-butenylene, 2,2-ethylene-trimethylene, 2,2-pentamethylene-trimethylene, 1-benzyl-ethylene, 2-phenyl-trimethylene, 2-methyl-2-phenyl-trimethylene, 2-ethyl-2-phenyl-trimethylene, cis-1,2-cyclohexylene or o-xylylene radical. $R_2$, $R_3$ and $R_4$ as loweralkyl or alkoxy radicals are, e.g. methyl, methoxy or ethoxy radicals; however, when $R_3$ is hydrogen, the methyl or methoxy group and $R_4$ is hydrogen, $R_2$ can also be, e.g. an ethyl, n-propyl, isopropyl, n-butyl, tert.butyl, n-propoxy, isopropoxy or n-butoxy radical. The divalent radical A is, e.g. a methylene, ethylidene, ethylene, propylene, 1,1-dimethyl-ethylene, trimethylene, 1-methyl-trimethylene, 2-methyl-trimethylene or tetramethylene radical.

More in particular, those compounds falling under Formula I in which X and Y both represent oxygen atoms and A represents —$CH_2$— or —$CH_2$—$CH_2$— are muscle relaxants with no hypnotic or sedative action, and are useful in the treatment of muscle spasms, especially spasms of skeleton muscles. These compounds are also effective as anorexogenics.

A second class of compounds falling under Formula I in which A represents —$CH_2$—$CH_2$—$CH_2$—, both X and Y represent oxygen atoms and $R_2$, $R_3$ and $R_4$ represent hydrogen, lower alkyl or lower alkoxy radicals, or, when $R_4$ is hydrogen, $R_2$ and $R_3$ together represent the methylenedioxy radical, are useful as anorexogenics with mild sedative effects.

Thirdly, compounds falling under Formula I in which A represents —$CH_2$—$CH_2$—$CH_2$—, each of X and Y represents an oxygen atom and at least one of $R_2$, $R_3$ and $R_4$ represents a chlorine atom, remaining substituents among these three representing hydrogen, lower alkyl or lower alkoxy, are useful as anorexogenics with distinct sedative effects.

Finally, compounds of the class falling under Formula I, in which X represents sulfur, Y represents oxygen or sulfur, and A, $R_1$, $R_2$, $R_3$ and $R_4$ have the same meanings as in Formula I, are useful as analgesics.

To produce the new compounds of general Formula I, a compound of the general Formula II

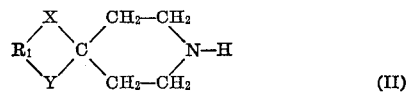

(II)

wherein X, Y and $R_1$ have the meanings given in Formula I, is reacted with a reactive ester of a compound of general Formula III

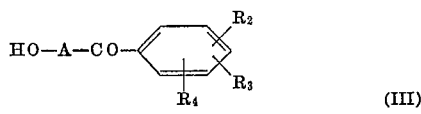

(III)

wherein $R_2$, $R_3$, $R_4$ and A have the meanings given in Formula I, the reaction being performed in the presence of an acid binding agent and, preferably, in a solvent.

Individual starting materials of general Formula II such as 1,4-dioxa-8-azaspiro[4.5]decane and 1,5-dioxa-9-azaspiro[5.5]undecane, are known and others can be produced analogously thereto starting from 4,4-dihydroxypiperidine hydrochloride (4-piperidone hydrate hydrochloride) and the corresponding dihydroxy-, hydroxy-mercapto or dimercapto compounds. Insofar as the latter compounds are not known, they can be produced analogously to the known compounds, e.g. by reduction of corresponding dicarboxylic acid esters or mercapto acid esters by means of lithium aluminum hydride to form dihydroxy- or hydroxy-mercapto compounds and, if desired, conversion of these into corresponding dimercapto compounds by way of the corresponding dichloro-mercapto or chloro-mercapto compounds. Examples of other starting materials of general Formula II are 2,3-dimethyl-1,4-dioxa-8-azaspiro[4.5]decane, 2-benzyl-1,4-dioxa-8-azaspiro[4.5]decane, 2-methyl-1,5 - dioxa-9-azaspiro[5.5]undecane, 3,3-diethyl-1,5-dioxa-9 - azaspiro[5.5]undecane, 3 - phenyl-1,5-dioxa-9-azaspiro [5.5]undecane, 3 - methyl - 3-phenyl-1,5-dioxa-9-azaspiro [5.5]undecane, 3-ethyl-3-phenyl-1,5-dioxa-9-azaspiro[5.5] undecane, 7,12-dioxa-3-azaspiro[5.6]dodecane, 7,12-dioxa-3 - azaspiro[5.6]dodec-9-ene, 5,12-dioxa-9-azadispiro[2.2.5.2]tridecane, 7,16-dioxa-3-azadispiro[5.2.5.2]hexadecane, hexahydro-spiro[1,3-benzodioxole-2,4'-piperidine], 1,5-dihydro - spiro[2,4-benzodioxepin-3,4'-piperidine], 1-oxa-4-thia - 8 - azaspiro[4.5]decane, 2-benzyl-1-oxa-4-thia-8-azaspiro[4.5]decane, 3-benzyl - 1 - oxa-4-thia-8-azaspiro[4.5] decane, 3 - benzyl-1-oxa-4-thia-8-azaspiro[4.5]decane, 3-phenyl-1-oxa-5-thia-9-azaspiro[5.5] undecane, 7-oxa-5-thia - 3 - azaspiro[5.6]dodecane, 1,4-dithia-8-azaspiro[4.5] decane, 2-methyl-1,4-dithia-8-azaspiro[4.5]decane and 1, 5 - dithia-9-azaspiro[5.5]undecane, 3-phenyl-1,5-dithia-9-azaspiro[5.5]undecane, 3-ethyl-3-phenyl-1,5-dithia-9-azaspiro[5.5]undecane and 7,12 - dithia - 3 - azaspiro[5.6]dodecane.

Reactive ester of compounds of general Formula III are, in particular, halogen hydracid esters such as chlorides and bromides, also, e.g. aryl sulphonic and alkane sulphonic acid esters such as p-toluene sulphonic acid esters and methane sulphonic acid esters. The following, for example, are suitable: 2 - chloro- and 2 - bromoacetophenone, 2-chloro- and 2-bromo- propiophenone, 3-chloro- and 3 - bromo- propiophenone, 2-bromobutyrophenone, 3-bromobutyrophenone, 4-chloro- and 4-bromobutyrophenone and 5-chlorovalerophenone, as well as corresponding compounds which contain one or more substituents according to the definition of $R_2$, $R_3$ and $R_4$ in the benzene nucleus. In place of the halogen compounds mentioned, also corresponding compounds can be used, for example, which, instead of the aliphatically bound chlorine or bromine atom, contain the p-toluene sulphonyloxy or methane sulphonyloxy radical. Suitable acid binding agents are, in particular, alkali carbonates, also tertiary organic bases such as triethylamine or pyridine. Particularly suitable solvents are organic solvents, e.g. dimethyl formamide, ethyl acetate, ketones such as acetone, methylethyl ketone or diethyl ketone, or hydrocarbons such as benzene or toluene. The reaction is performed at room temperature to moderately raised temperatures, e.g. at the boiling temperature of the above solvents and, if desired, it is promoted by the addition of slight amounts of an alkali iodide.

Compounds of general Formula I wherein A is an ethylene radical optionally alkylsubstituted in α-position to the carbonyl group, i.e. an ethylene, propylene or 1-ethylethylene radical, are produced according to a second process by reacting together a ketone of the general Formula IV

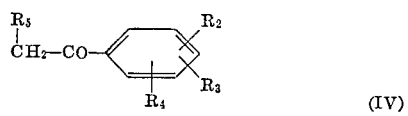

(IV)

wherein $R_5$ represents hydrogen, the methyl or ethyl radical and $R_2$, $R_3$ and $R_4$ have the meanings given in Formula I, a mineral acid salt of a compound of the general Formula II defined above, and formaldehyde. The reaction can be performed under the usual Mannich reaction conditions, e.g. by boiling equimolar amounts of a ketone of the general Formula IV, the hydrochloride of a compound of the general Formula II and formaldehyde, e.g. in the form of paraformaldehyde, in ethanol. Starting materials of the general Formula IV can be acetophenone, propiophenone and butyrophenone, as well as substitution products thereof which are substituted according to the definitions of $R_2$, $R_3$ and $R_4$.

Compounds of general Formula I wherein A is an ethylene radical which can be substituted by alkyl radicals having, in all, at most 2 carbon atoms, can be produced by a third process. This process is characterised by reacting a compound of the general Formula II given above with an unsaturated ketone of the general Formula V

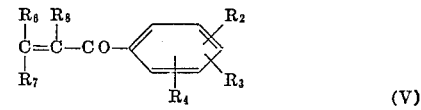

(V)

wherein $R_6$, $R_7$ and $R_8$ represent hydrogen or alkyl radicals having, in all, at most 2 carbon atoms, and $R_2$, $R_3$ and $R_4$ have the meanings given in Formula I. For example, the desired compound of general Formula II is added to the unsaturated ketone by heating or, if necessary, boiling the reaction components in an organic solvent such as ethanol, petroleum ether, cyclohexane, benzene or toluene. Examples of starting materials of general Formula V are acrylophenone, methacrylophenone, crotonophenone and seneciophenone as well as corresponding compounds which, in the benzene nucleus, have one or more substituents according to the definition of $R_2$, $R_3$ and $R_4$.

The compounds of general Formula I obtained according to the process of the invention are then converted, if desired, into their addition salts with inorganic and organic acids in the usual way. For example, the acid desired as salt component or a solution thereof is added to a solution of a compound of the general Formula I in an organic solvent such as methanol, ethanol or diethyl ether and the salt which is formed direct or after addition of a second organic liquid, such as diethyl ether to methanol, is removed.

Pharmaceutically acceptable acid addition salts can be used as medicaments instead of the free bases, i.e. salts with those acids the anions of which themselves have no physiological action or have a desired physiological action, in the usual dosages. It is also of advantage if the salts to be used as medicaments crystallise well and are not or are only slightly hygroscopic. For example, hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, lactic acid, succinic acid, fumaric acid, maleic acid, benzoic acid, salicylic acid, phenylacetic acid, mandelic acid, embonic acid and naphthalene-1,5-disulphonic acid can be used for salt formation with the compounds of general Formula I.

The new compounds of general Formula I and their salts are administered orally, rectally or parenterally. The daily dosages of the free bases or of non-toxic salts thereof vary between 5 and 1000 mg. for adult patients. Suitable dosage units such as dragées (sugar coated tablets), tablets, suppositories or ampoules, preferably contain 5–200 mg. of a compound of general Formula I or a non-toxic salt thereof.

Dosage units for oral administration preferably contain between 0.1% and 90% of a compound of the general Formula I or a non-toxic salt thereof as active substance. Such units are produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols (Carbowaxes) of suitable molecular weights, to form tablets or dragée cores. The latter are coated, e.g. with concentrated sugar solutions which can also contain, e.g. gum arabic, talcum and/or titanium dioxide, or with a lacquer which dissolves easily in volatile organic solvents or mixtures of solvents. Dyestuffs can be added to these coatings, e.g. to distinguish between varying concentrations of active substance.

Dosage units for rectal administration are, e.g. suppositories which consist of a combination of a compound of general Formula I or a suitable salt thereof with a neutral fatty foundation, or also gelatine rectal capsules which contain a combination of the active substance with polyethylene glycols (Carbowaxes) of suitable molecular weight.

Ampoules for parenteral, particularly intramuscular and also intravenous administration preferably contain a water soluble salt of a compound of general Formula I as active substance in a concentration of, preferably, 0.5-10%, in aqueous solution, optionally together with suitable stabilising agents and buffer substances.

The following prescriptions further illustrate the production of tablets and dragées:

(a) 10.0 g of active substance, e.g. 4-(2-methyl-1,5-dioxa-9-azaspiro]5.5[undec - 9-yl) - 4'-isopropyl-butyrophenone hydrochloride, 30.0 g. of lactose and 5.0 g. of highly dispersed silicic acid are mixed, the mixture is moistened with a solution of 5.0 g. of gelatine and 7.5 g. of glycerine in distilled water and granulated through a sieve. The granulate is dried, sieved and carefully mixed with 3.5 g. of potato starch, 3.5 g. of talcum and 0.5 g. of magnesium stearate. The mixture is pressed into 1,000 tablets each weighing 65 mg. and containing 10 mg. of active substance.

(b) 10.0 g. of active substance, e.g. 4-(3-phenyl-1,5-dioxa-9-azaspiro[5.5]undec - 9 - yl)-butyrophenone hydrochloride, 15 g. of lactose and 20 g. of starch are mixed, the mixture is moistened with a solution of 5.0 g. of gelatine and 7.5 g. of glycerin in distilled water and granulated through a sieve. The granulate is dried, sieved and carefully mixed with 3.5 g. of potato starch, 3.5 g. of talcum and 0.5 g. of magnesium stearate. The mixture is pressed into 1,000 dragée cores. These are then coated with a concentrated syrup of 26.660 g. of crystallised saccharose, 17.500 g. of talcum, 1.000 g. of shellac, 3.750 g. of gum arabic, 1.000 g. of highly dispersed silicic acid and 0.090 g. of dyestuff and dried. The dragées obtained each weigh 115 mg. and contain 10 mg. of active substance.

The following examples illustrate the production of the new compounds of general Formula I but in no way limit the scope of the invention thereto. The temperatures are given in degrees centigrade.

Example 1

21.3 g. (0.1 mol) of 2-bromopropiophenone, 14 g. of potassium carbonate and 0.5 g. of potassium iodide are added to a solution of 14.3 g. (0.1 mol) of 1,4-dioxa-8-azaspiro[4.5]decane in 100 ml. of acetone. The mixture is refluxed for 15 minutes, then filtered and the residue is washed with another 100 ml. of acetone. The solvent is evaporated in vacuo and the oil which remains is taken up in 300 ml. of ether. The solution is neutralised with ethereal hydrochloric acid whereupon the hydrochloride of the reaction product precipitates.

The hydrochloride of 2-(1,4-dioxa-8-azaspiro[4.5]dec-8-yl)-propiophenone obtained is recrystallised from methanol/ether and melts at 145°.

The following compounds are obtained in an analogous way:

(a) using 25.5 g. (0.1 mol) of 2-bromo-4'-tert. butyl-acetophenone, 2-(1,4-dioxa-8-azaspiro[4.5]dec - 8 - yl)- 4'-tert. butyl-acetophenone hydrochloride, M.P. 207–208°;

(b) on using 22.9 g. (0.1 mol) of 2-bromo-4'-methoxy-acetophenone, 2-(1,4-dioxa-8-azaspiro[4.5]dec - 8 - yl)- 4'-methoxy-acetophenone hydrochloride, M.P. 208–209°;

(c) on using 26.9 g. (0.1 mol) of 2-bromo-4'-isopropyl-propiophenone, 2 - (1,4 - dioxa-8-azaspiro[4.5]dec - 8 - yl) - 4' - isopropyl-propiophenone hydrochloride, M.P. 198–200°;

The following compounds are also obtained analogously using the spiro compounds given below and the corresponding, optionally substituted 2-bromoacetophenones, 2-bromopropiophenones and 2-bromobutyrophenones:

(d) 2 - (2-methyl-1,4-dioxa-8-azaspiro[4.5]dec - 8 - yl)-4'-isopropyl-butyrophenone hydrochloride, M.P. 200–203°;

(e) 2 - (3,3 - diethyl - 1,5-dioxa-9-azaspiro[5.5]undec-9-yl)-butyrophenone hydrochloride, M.P. 190–193°;

(f) 2 - (7,12 - dioxa-3-azaspiro[5.6]dodec-3-yl)-acetophenone hydrochloride, M.P. 185–190°;

(g) 2 - (7,12 - dioxa-3-azaspiro[5.6]dodec-3-yl)-4'-tert. butylacetophenone hydrochloride, M.P. 201–203°;

(h) 2-(7,12-dioxa-3-azaspiro[5.6]dodec-3-yl)-propiophenone hydrochloride, M.P. 204–205°;

(i) 2-(2-methyl-1,5-dioxa-9-azaspiro[5.5]undec-9-yl)-acetophenone hydrochloride;

(j) 2-(3-phenyl-1,5-dioxa-9-azaspiro[5.5]undec-9-yl)-acetophenone hydrochloride;

(k) 2-(3-methyl-3-phenyl-1,5-dioxa-9-azaspiro[5.5]undec-9-yl)-acetophenone hydrochloride;

(l) 2-(7,12-dioxa-3-azaspiro[5.6]dodec-9-en-3-yl)-acetophenone hydrochloride;

(m) 2-(5,12-dioxa-9-azadispiro[2.2.5.2]tridec-9-yl)-acetophenone hydrochloride;

(n) 2-(7,16-dioxa-3-azadispiro[5.2.5.2]hexadec-3-yl)-acetophenone hydrochloride;

(o) 2-(cis-hexahydro-spiro[1,3-benzodioxole-2,4'-piperidine]-1'-yl)-acetophenone hydrochloride;

(p) 2-(1,5-dihydro-spiro[2,4-benzodioxepin-3,4'-piperidine]-1'-yl)-acetophenone hydrochloride;

(q) 2-(1,4-dioxa-8-azaspiro[4.5]dec-8-yl)-4'-methyl-acetophenone hydrochloride;

(r) 2-(1,4-dioxa-8-azaspiro[4.5]dec-8-yl)-3',4'-dimethyl-acetophenone hydrochloride;

(s) 2-(1,4-dioxa-8-azaspiro[4.5]dec-8-yl)-4'-chloro-acetophenone hydrochloride;

(t) 2-(1,4-dioxa-8-azaspiro-[4.5]dec-8-yl)-3',4'-dichloro-acetophenone hydrochloride;

(u) 2-(1,4-dioxa-8-azaspiro[4.5]dec-8-yl)-3',4'-dimethoxy-acetophenone hydrochloride;

(v) 2-(1,4-dioxa-8-azaspiro[4.5]dec-8-yl)-2',3',4'-trimethoxy-acetophenone hydrochloride;

(w) 2-(1,4-dioxa-8-azaspiro[4.5]dec-8-yl)-3',4'-methylenedioxy-acetophenone hydrochloride;

(x) 2,(3-ethyl-3-phenyl)-1,5-dioxa-9-azaspiro[5.5]undec-9-yl-acetophenone hydrochloride.

The 2 - methyl - 1,4-dioxa-8-azaspiro[4.5]decane necessary as starting material for the compound (d) can be produced as follows:

30 g. of 4,4-dihydroxy-piperidine hydrochloride, 17 g. of 1,2-propanediol and 1 g. of p-toluene sulphonic acid in 500 ml. of benzene are boiled in a water separator while stirring vigorously. When no more water passes over, the benzene is decanted and 100 ml. of 50% potassium carbonate solution and 200 ml. of chloroform are added to the residue while stirring. After removal of the chloroform phase, the aqueous phase is extracted three times with chloroform. The combined chloroform phases are washed with water, dried with sodium sulphate and concentrated. The 2 - methyl-1,4-dioxa-9-azaspiro[4.5]decane which remains is distilled in vacuo. B.P. 95°/12 torr.

The following compounds are obtained in an analogous way:

3,3-diethyl-1,5-dioxa-9-azaspiro[5.5]undecane, B.P. 145–149°/12 torr (starting material for e);

7,12 - dioxa-3-azaspiro[5.6]dodecane, B.P. 113–115°/11 torr (starting material for f, g and h);

2 - methyl-1,5-dioxa-9-azaspiro[5.5]undecane, B.P. 107°/10 torr starting material for i);

3 - phenyl-1,5-dioxa-9-azaspiro[5.5]undecane, B.P. 137°/0.01 torr (starting material for j);

3-methyl-3-phenyl-1,5-dioxa-9-azaspiro[5.5]undecane, B.P. 145–150° 0.001 torr (starting material for k);

7,12-dioxa-3-azaspiro[5.6]dodec-9-ene, B.P. 128°/12 torr (starting material for l);

5,12-dioxa-9-azadispiro[2.2.5.2]tridecane, B.P. 131–144°/11 torr (starting material for m);

7,16-dioxa-3-azadispiro[5.2.5.2]hexadecane, B.P. 100–110°/0.001 torr (starting material for n);

cis-hexahydro-spiro[1,3-benzodioxole-2,4'-piperidine], B.P. 128–130°/10 torr (produced using cis-1,2-cyclohexanediol; it is the starting material for o);

1,5-dihydro-spiro[2,4-benzodioxepin-3,4'-piperidine, M.P. 120–121° (produced using o-xylene-α,α'-diol; it is the starting material for p);

3-ethyl-3-phenyl-1,5-dioxa-9-azaspiro[5.5]undecane (starting material for x).

Example 2

23.3 g. (0.1 mol) of 3-phenyl-1,5-dioxa-9-azaspiro-[5.5]undecane (cf. Example 1), 18.3 g. (0.1 mol) of 4-chlorobutyrophenone, 14 g. of potassium carbonate and 0.5 g. of potassium iodide are refluxed in 100 ml. of benzene for 24 hours. Inorganic salts are filtered off from the reaction solution and the residue is washed with another 100 ml. of benzene. The filtrate is concentrated in vacuo and the oil which remains is dissolved in 100 ml. of abs. ether. On neutralising this solution with ethereal hydrogen chloride solution, the reaction product precipitates in the form of the hydrochloride. The 4-(3-phenyl-1,5-dioxa-9-azaspiro[5.5]undec-9-yl)-butyrophenone hydrochloride obtained melts at 221–222°.

The following compounds are produced in an analogous way:

(a) 4-(1,4-dioxa-8-azaspiro[4.5]dec-8-yl)-butyrophenone hydrochloride, M.P. 187–189°;
(b) 4-(2-methyl-1,5-dioxa-9-azaspiro[5.5]undec-9-yl-4'-isopropyl-butyrophenone hydrochloride, M.P. 203°;
(c) 4-(7,12-dioxa-3-azaspiro[5.6]dodec-3-yl-4'-isopropylbutyrophenone hydrochloride, M.P. 188–189°;
(d) 4-(3-phenyl-1,5-dioxa-9-azaspiro[5.5]undec-9-yl)-4'-methylbutyrophenone hydrochloride;
(e) 4-(1,5-dioxa-9-azaspiro[5.5]undec-9-yl)-butyrophenone hydrochloride;
(f) 4-(2-methyl-1,5-dioxa-9-azaspiro[5.5]undec-9-yl)-butyrophenone hydrochloride;
(g) 4-(3-phenyl-1,5-dioxa-9-azaspiro[5.5]undec-9-yl)-3',4'-dimethylbutyrophenone hydrochloride;
(h) 4-(3-phenyl-1,5-dioxa-9-azaspiro[5.5]undec-9-yl)-2',4',6'-trimethylbutyrophenone hydrochloride;
(i) 4-(3-phenyl-1,5-dioxa-9-azaspiro[5.5]undec-9-yl)-4'-tert. butylbutyrophenone hydrochloride;
(j) 4-(3-phenyl-1,5-dioxa-9-azaspiro[5.5]undec-9-yl)-4'-chlorobutyrophenone hydrochloride;
(k) 4-(3-phenyl-1,5-dioxa-9-azaspiro[5.5]undec-9-yl)-2',4'-dichlorobutyrophenone hydrochloride;
(l) 4-(3-phenyl-1,5-dioxa-9-azaspiro[5.5]undec-9-yl)-3',4'-dichlorobutyrophenone hydrochloride;
(m) 4-(3-phenyl-1,5-dioxa-9-azaspiro[5.5]undec-9-yl)-4'-methoxybutyrophenone hydrochloride;
(n) 4-(3-phenyl-1,5-dioxa-9-azaspiro[5.5]undec-9-yl)-2',4'-dimethoxybutyrophenone hydrochloride;
(o) 4-(3-phenyl-1,5-dioxa-9-azaspiro[5.5]undec-9-yl)-3',4'-dimethoxybutyrophenone hydrochloride;
(p) 4-(3-phenyl-1,5-dioxa-9-azaspiro[5.5]undec-9-yl)-2',3',4'-trimethoxybutyrophenone hydrochloride;
(q) 4-(3-phenyl-1,5-dioxa-9-azaspiro[5.5]undec-9-yl)-2',4',6'-trimethoxybutyrophenone hydrochloride;
(r) 4-(3-methyl-3-phenyl-1,5-dioxa-9-azaspiro[5.5]undec-9-yl)-butyrophenone hydrochloride;
(s) 4-(3,3-diethyl-1,5-dioxa-9-azaspiro[5.5]undec-9-yl)-butyrophenone hydrochloride;
(t) 4-(7,12-dioxa-3-azaspiro[5.6]dodec-9-en-3-yl)-butyrophenone hydrochloride;
(u) 4-(5,12-dioxa-9-azadispiro[2.2.5.2]tridec-9-yl)-butyrophenone hydrochloride;
(v) 4-(7,16-dioxa-3-azadispiro[5.2.5.2]hexadec-3-yl)-butyrophenone hydrochloride;
(w) 4-(cis-hexahydro-spiro[1,3-benzodioxole-2,4'-piperidine]-1'-yl)-butyrophenone hydrochloride;
(x) 4-(1,5-dihydro-spiro[2,4-benzodioxepin-3,4'-piperidine]-1'-yl)-butyrophenone hydrochloride;
(y) 4-(3-ethyl-3-phenyl-1,5-dioxa-9-azaspiro[5.5]undec-9-yl)-butyrophenone hydrochloride.

The compounds mentioned in Examples 4 and 5 can also be produced analogously using optionally nuclear substituted 3-halogen propiophenones as starting materials.

The production of the spiro compounds necessary as starting materials has been described in Example 1. Insofar as they are not known, the substituted 4-chlorobutyrophenones can be produced according to Friedel-Crafts analogously to the unsubstituted compound. When ether groups are present, the reaction should be performed under mild reaction conditions.

Example 3

21.8 g. (0.1 mol) of 4,4'-dichlorobutyrophenone, 14 g. of potassium carbonate and 0.5 g. of potassium iodide are added to a solution of 15.9 g. (0.1 mol) of 1-oxa-4-thia-8-azaspiro[4.5]decane in 100 ml. of toluene. The mixture is refluxed for 14 hours then filtered and the residue is washed with another 100 ml. of toluene. The filtrate is concentrated in vacuo and the oil which remains is taken up in 300 ml. of ether. The solution is neutralised with ethereal hydrogen chloride solution whereupon the hydrochloride is obtained as reaction product. The 4-(1-oxa-4-thia-8-azaspiro[4.5]dec-8-yl)-4'-chlorobutyrophenone hydrochloride so obtained is recrystallised from methanol/ether, M.P. 235°.

The following compounds are obtained analogously:

(a) 2-(1-oxa-4-thia-8-azaspiro[4.5]dec-8-yl)-acetophenone hydrochloride, M.P. 212–214°;
(b) 4-(1-oxa-4-thia-8-azaspiro[4.5]dec-8-yl)-butyrophenone hydrochloride;
(c) 4-(1-oxa-4-thia-8-azaspiro[4.5]dec-8-yl)-3',4'-dimethylbutyrophenone hydrochloride;
(d) 4-(1-oxa-4-thia-8-azaspiro[4.5]dec-8-yl)2',4',6'-trimethylbutyrophenone hydrochloride;
(e) 4-(1-oxa-4-thia-8-azaspiro[4.5]dec-8-yl)-2',4',6'-trimethoxybutyrophenone hydrochloride;
(f) 4-(3-benzyl-1-oxa-4-thia-8-azaspiro[4.5]dec-8-yl)-4'-chlorobutyrophenone hydrochloride;
(g) 4-(3-phenyl-1-oxa-5-thia-9-azaspiro[5.5]undec-8-yl)-4'-chloro-butyrophenone hydrochloride;
(g) 4-(3-phenyl-1-oxa-5-thia-9-azaspiro[5.5]undec-8-yl)-4'-chloro-butyrophenone hydrochloride;
(h) 4-(1,4-dithia-8-azaspiro[4.5]dec-8-yl)-4'-chlorobutyrophenone hydrochloride, M.P. 257–262°;
(i) 4-(1,4-dithia-8-azaspiro[4.5]dec-8-yl)-4'-methylbutyrophenone hydrochloride;
(j) 4-(1,4-dithia-8-azaspiro[4.5]dec-8-yl)-3,4,-dimethylbutyrophenone hydrochloride;
(k) 4-(1,4-dithia-8-azaspiro[4.5]dec-8-yl)-2',4',6'-trimethylbutyrophenone hydrochloride;
(l) 4-(1,4-dithia-8-azaspiro[4.5]dec-8-yl)-2',4',6'-trimethoxybutyrophenone hydrochloride;
(m) 4-(2-methyl-1,4-dithia-8-azaspiro[4.5]dec-8-yl)-butyrophenone hydrochloride;
(n) 4-(1,5-dithia-9-azaspiro[5.5]undec-9-yl)-butyrophenone hydrochloride;
(o) 4-(3-phenyl-1,5-dithia-9-azaspiro[5.5]undec-9-yl)-4'-chloro-butyrophenone hydrochloride;
(p) 4-(3-ethyl-1,5-dithia-9-azaspiro[5.5]undec-9-yl)-4'-chloro-butyrophenone hydrochloride;
(q) 4-(7,12-dithia-3-azaspiro[5.6]dodec-3-yl)4'-chloro-butyrophenone hydrochloride;

The spiro compounds necessary as starting materials are produced as follows:

51 g. of 4,4-dihydroxy-piperidine hydrochloride, 26 g. of 2-mercapto ethanol and 0.5 g. of p-toluene sulphonic acid in 500 ml. of benzene are boiled in a water separator while stirring vigorously. When no more water passes over, the benzene is decanted and 100 ml. of 50% potassium carbonate solution and 200 ml. of chloroform are added to the residue while stirring. After removal of the chloroform phase, the aqueous phase is extracted three times with chloroform. The combined chloroform phases are washed with a small amount of water, dried with sodium sulphate and concentrated. The 1-oxa-4-thia-8-aza-spiro[4.5]decane which remains is distilled under water jet vacuum. B.P. 117–120°/10 Torr.

The following compounds are obtained analogously on reacting with 4,4-dihydroxy-piperidine hydrochloride:

with 2-mercapto-3-phenyl-1-propanol;
3-benzyl-1-oxa-4-thia-8-azaspiro[4.5]decane (starting material for f);
with 2-phenyl-3-mercapto-1-propanol;
3-phenyl-1-oxa-5-thia-9-azaspiro[5.5]undecane (starting material for g);
with 1,2-ethane-dithiol;
1,4-dithia-8-azaspiro[4.5]decane, M.P. of the hydrochloride 285° (with decomposition) (starting material for h, i, j, k, l);
with 1,2-propane-dithiol;
2-methyl-1,4-dithia-8-azaspiro[4.5]decane (starting material for m);
with 1,3-propane-dithiol;
1,5-dithia-9-azaspiro[5.5]undecane (starting material for n);
with 2-phenyl-1,3-propane-dithiol;
3-phenyl-1,5-dithia-9-azaspiro[5.5]undecane (starting material for o);
with 2-ethyl-2-phenyl-1,3-propane-dithiol;
3-ethyl-3-phenyl-1,5-dithia-9-azaspiro[5.5]undecane (starting material for p); and
with 1,4-butane-dithiol;
7,12-dithia-3-azaspiro[5.6]dodecane (starting material for q).

Example 4

A mixture of 18 g. (0.1 mol) of 1,4-dioxa-8-azaspiro[4.5]decane hydrochloride, 3.0 g. (0.1 mol) of paraformaldehyde and 15.5 g. (0.1 mol) of 4'-chloroacetophenone in 50 ml. of ethanol is refluxed for 4 hours. The paraformaldehyde slowly dissolves. The ethanol is then distilled off in vacuo whereupon 4'-chloro-3-(1,4-dioxa-8-azaspiro[4.5]dec-8 - yl) - propiophenone hydrochloride crystallises out. It is recrystallised from methanol/ether and then melts, with decomposition, at 195°.

The following compounds are obtained analogously to the above example:

(a) 3-(1,4-dioxa-8-azaspiro[4.5]dec-8-yl)-2-methyl-propiophenone hydrochloride M.P. 185°;
(b) 3-(1,4-dioxa-8-azaspiro[4.5]dec-8-yl)-propiophenone hydrochloride, M.P. 173–175°;
(c) 3-(1,4-dioxa-8-azaspiro[4.5]dec-8-yl)-4'-methyl-propiophenone hydrochloride, M.P. 162–163°;
(d) 3-(1,4-dioxa-8-azaspiro[4.5]dec-8-yl)-3',4'-dimethyl-propiophenone hydrochloride, M.P. 162–163°;
(e) 3-(1,4-dioxa-8-azaspiro[4.5]dec-8-yl)-4'-isopropyl-propiophenone hydrochloride;
(f) 3-(1,4-dioxa-8-azaspiro[4.5]dec-8-yl)-4'-tert. butyl-propiophenone hydrochloride;
(g) 3-(1,4-dioxa-8-azaspiro[4.5]dec-8-yl)-2',4'-dichloro-propiophenone hydrochloride;
(h) 3-(1,4-dioxa-8-azaspiro[4.5]dec-8-yl)-3',4'-dichloro-propiophenone hydrochloride;
(i) 3-(1,4-dioxa-8-azaspiro[4.5]dec-8-yl)-4'-methoxy-propiophenone hydrochloride;
(j) 3-(1,4-dioxa-8-azaspiro[4.5]dec-8-yl)-3',4'-dimethoxypropiophenone hydrochloride;
(k) 3-(1,4-dioxa-8-azaspiro[4.5]dec-8-yl)-2',3',4'-trimethoxypropiophenone hydrochloride;
(l) 3-(1,4-dioxa-8-azaspiro[4.5]dec-8-yl)-3',4'-methylenedioxypropiophenone hydrochloride;
(m) 3-(2-methyl-1,4-dioxa-8-azaspiro[4.5]dec-8-yl)-propiophenone hydrochloride;
(n) 3-(1,5-dioxa-9-azaspiro[5.5]undec-9-yl)-propiophenone hydrochloride;
(o) 3-(2-methyl-1,5-dioxa-9-azaspiro[5.5]undec-9-yl)-propiophenone hydrochloride;
(p) 3-(3,3-diethyl-1,5-dioxa-9-azaspiro[5.5]undec-9-yl)-propiophenone hydrochloride;
(q) 3-(3-phenyl-1,5-dioxa-9-azaspiro[5.5]undec-9-yl)-propiophenone hydrochloride;
(r) 3-(3-methyl-3-phenyl-1,5-dioxa-9-azaspiro[5.5]undec-9-yl)-propiophenone hydrochloride;
(s) 3-(7,12-dioxa-3-azaspiro[5.6]dodec-3-yl)-4'-methyl-propiophenone hydrochloride, M.P. 187–189°;
(t) 3-(7,12-dioxa-3-azaspiro[5.6]dodec-3-yl)-3',4'-dimethylpropiophenone hydrochloride, M.P. 172–173°;
(u) 3-(7,12-dioxa-3-azaspiro[5.6]dodec-9-en-3-yl)-propiophenone hydrochloride;
(v) 3-(5,12-dioxa-9-azadispiro[2.2.5.2]tridec-9-yl)-propiophenone hydrochloride;
(w) 3-(7,16-dioxa-3-azadispiro[5.2.5.2]hexadec-3-yl)-propiophenone hydrochloride;
(x) 3-(cis-hexahydro-spiro[1,3-benzodioxole-2,4'-piperidine]-1'-yl)-propiophenone hydrochloride;
(y) 3-(1,5-dihydro-spiro[2,4-benzodioxepin-3,4'-piperidine]-1'-yl)-propiophenone hydrochloride.

Example 5

A mixture of 21.2 g. (0.1 mol) of 1,4-dithia-8-azaspiro[4.5]decane hydrochloride (cf. example 3), 3.0 g. (0.1 mol) of paraformaldehyde and 12.0 g. of acetophenone in 50 ml. of ethanol is refluxed for 4 hours. The paraformaldehyde slowly dissolves. The ethanol is then distilled off in vacuo whereupon the 3-(1,4-dithia-8-azaspiro[4.5]dec-8-yl)-propiophenone hydrochloride crystallises out. It is recrystallised from methanol/ether, M.P. 220°.

(a) 3-(1-oxa-4-thia-8-azaspiro[4.5]dec-8-yl)-propiophenone, and
(b) 3-(1,5-dithia-9-azaspiro[5.5]undec-9-yl)-propiophenone are produced analogously.

Example 6

2.8 g. (0.02 mol) of 1,4-dioxa-8-azaspiro[4.5]decane and 2.8 g. (0.022 mol) of acrylophenone are dissolved in 50 ml. of ethanol and the solution is refluxed. The progress of the reaction can be followed by thin layer chromatography. On silica gel plates, with methanol, the secondary amine remains almost as it was at the start whilst the end product has an Rf value of about 0.7. The reaction is complete after refluxing for 1 hour. The solvent is evaporated in vacuo and the oily residue is converted into the hydrochloride analogously to Example 1. The 3-(1,4-dioxa-8-azaspiro[4.5]dec-8-yl-propiophenone hydrochloride obtained melts at 173–175° C.

In the description of a second aspect of the invention given below, where reference is made to preceding numbers of formulas, symbols, or examples, it is to the identified formula or symbol or examples in connection with this second aspect of the invention.

It has been found that piperidene derivatives and their homologs according to the second aspect of this invention, which correspond to the formula

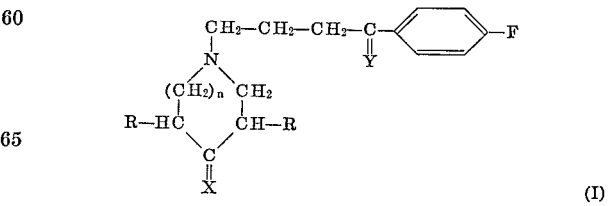

(I)

wherein >C=X represents one of the following divalent radicals:

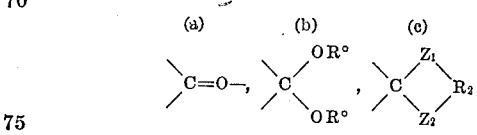

are especially the divalent radicals ((a) and (c), supra, in which radicals R⁰ represents hydrogen or a monovalent hydrocarbon radical, R₁, of at most 7 carbon atoms, but, in a first preferred class of compounds falling under Formula I, alkyl of from 1 to 3 carbon atoms, Each of Z₁ and Z₂ individually represents an oxygen or a sulfur atom, R₂ represents a divalent hydrocarbon radical of from 2 to 10 carbon atoms from 2 to 4 of which are straight-enchained between Z₁ and Z₂ so as to form an aliphatic bridge therebetween, and, in a second preferred class of compounds falling under Formula I, R₂ represents alkylene of from 2 to 4, and especially from 2 to 3 carbon atoms;

>C=Y represents the grouping >C=O,

or

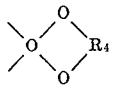

R₃ representing a monovalent, and

R₄ representing a divalent hydrocarbon radical of at most 5 carbon atoms and, in the first and second class of preferred compounds falling under Formula I, as mentioned hereinbefore, R₄ represents a divalent alkylene radical of from 2 to 4 carbon atoms;

R represents hydrogen or lower alkyl; and n represents one of the integers 0, 1 and 2; and their pharmaceutically acceptable salts with inorganic and organic acids, have valuable pharmacological properties, among which there are, in particular, depressant action on the central nervous system which can be determined pharmacologically in warm blooded animals, by the potentiation of the action of substances such as hexobarbital and 2-methoxy-4-allyl-phenoxyacetic acid-N,N-diethylamide, reduction of amphetamine toxicity in grouped animals, reduction of motility and aggressiveness; and, in addition, an antagonistic action to apomorphine. The new compounds have a favorable therapeutic index and are largely free from extrapyramidal and autonomic side effects. The new compounds of Formula I are, therefore, useful as neuroleptic tranquilizers (calmatives and psychoregulators), e.g. in the treatment of psychic disturbances and also as sedatives, for which purposes they can be administered orally, rectally or parenterally in daily doses of 10 to 250 mg. calculated for adult patients. For parenteral application they are administered in the form of aqueous dispersions or solutions of their salts.

In the compounds of Formula I and the starting materials used therefor which are mentioned below, the monovalent radicals R₁ and, within the definition therefor given above, R₃ in any ketal, thioketal or mixed ketal groupings present are, for example, methyl, ethyl, n-propyl, isopropyl, n-butyl or isobutyl radicals. One or both radicals R₁ can also be, e.g. allyl, crotyl, methallyl, cyclopentyl, cyclohexyl, phenyl, p-tolyl, p-isopropylphenyl, benzyl, β-phenethyl, γ-phenylpropyl or cinnamyl radicals. Divalent radicals R₂ and R₄ are, for example, ethylene, propylene, 1,2-dimethylethylene, trimethylene, 1-methyltrimethylene, 1,3-dimethyltrimethylene, 2,2-dimethyltrimethylene, 2,2-diethyltrimethylene or tetramethylene radicals; also R₂ can be, e.g. the 1,2-cyclohexylene, o-phenylene dimethylene, 2-phenyltrimethylene, 2-methyl-2-phenyltrimethylene or 2,4-dimethyltetramethylene radical.

To produce the new compounds of general Formula I, a compound of the general Formula II

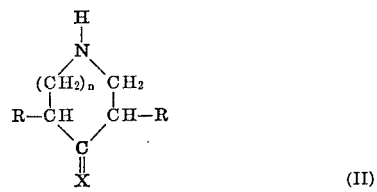

wherein X and n have the meanings given above, is reacted, in the presence of an acid binding agent, with a reactive ester of a compound of the general Formula III

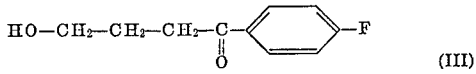

wherein Y has the meaning given above, if desired, a compound obtained of the general Formula I is modified with regard to its variables X and/or Y by splitting or introducing ketal, thioketal or mixed ketal groupings

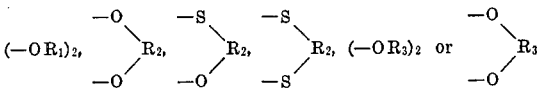

and, if desired, a compound of the general Formula I is converted into a salt with an inorganic or organic acid.

Reactive esters of compounds of the general Formula III are, in particular, hydrohalic acid esters such as chlorides and bromides, also e.g. sulphonic acid esters such as p-toluene-sulphonates and methane-sulphonates. Suitable acid binding agents are, in particular, alkali carbonates, also tertiary organic bases such as triethylamine or pyridine. Organic solvents, e.g. dimethyl formamide, ethyl acetate, ketones such as acetone, methylethyl ketone or diethyl ketone, or hydrocarbons such as, e.g. benzene, can be used as solvents. The reaction is performed at room temperature to moderately high temperatures, e.g. the boiling temperaatures of the solvents given above and, if desired, it can be promoted by the addition of slight amounts of an alkali iodide.

The modifications of the variables X and Y which can be performed, if desired, after the main reaction are, on the one hand, splitting of ketal, thioketal or mixed ketal groupings by hydrolysis, which can be effected by standing or heating in an acid aqueous medium, e.g. in alcoholic-aqueous hydrochloric acid or in acetone containing hydrochloric acid and water, or by transacetalisation, e.g. by standing or heating in the presence of readily acetalised carbonyl compounds such as anhydrous acetone, in the presence of slight amounts of an acid catalyst, e.g. p-toluene-sulphonic acid, or in the presence of a mineral acid or a Lewis acid. Partial splitting is also possible under moderate reaction conditions. When the ketal groupings are alike, that which is araliphatically bound, corresponding to Y, is attacked first, but also a ketal group X which is different from Y and more easily split can be split off by itself while the ketal grouping Y is retained. On the other hand, compounds of the general Formula I containing oxo groups, can be ketalised in the usual way, e.g. by treatment with a hydroxy compound R₁—OH or R₃—OH or with a dihydroxy compound R₂(OH)₂ or R₄(OH)₂, wherein R₁, R₂, R₃ and R₄ have the meanings given above, the treatment being performed in the presence of a dehydrating agent such as, e.g. p-toluene-sulphonic acid or hydrogen chloride. For this treatment, an excess of the hydroxy compound to be reacted or an inert, anhydrous organic solvent such as, for example, benzene, can serve as reaction medium. The reaction can be performed in the cold or at elevated temperatures if necessary, and, optionally, it can be accelerated by azeotropic removal of the water formed in the reaction. An oxo group X is replaced by a ketal grouping before an oxo group Y; such a partial ketalisation can easily be effected.

Starting materials of the general Formula II and also reactive esters of compounds of the general Formula III are known. Hydroxy and dihydroxy compounds suitable for acetal formation are, for example, low alkanols, alkenols, cycloalkanols, benzyl alcohol, β-phenylethanol, γ-phenylpropanol, cinnamyl alcohol or 1,2- 1,3- or 1,4-alkanediols, substituted alkanediol such as 2-phenyl-1,3-propanediol, 2-methyl-2-phenyl-1,3-propanediol, 2,2-diethyl-1,3-propanediol, cis-1,2-cyclohexanediol and o-hydroxymethylbenzyl alcohol; examples of hydroxyalkane thiols and alkylene dithiols are 2-hydroxy-ethane-thiol, 1,2-ethylenedithiol and 1,3-propylene-dithiol.

The compounds of general Formula I form salts with inorganic and organic acids. In particular pharmacologically acceptable acids are suitable for salt formation, i.e. acids which do not impart toxicity to the salts used for therapeutic application. Examples of acids which can be used for salt formation are: hydrochloric acid, hydrobromic acid, sulphuric acid, phosphoric acid, methane sulphonic acid, ethane sulphonic acid, ethane disulphonic acid, β-hydroxyethane sulphonic acid, acetic acid, succinic acid, fumaric acid, maleic acid, lactic acid, malic acid, tartaric acid, citric aid, benzoic acid, salicylic acid and mandelic acid, and other substances having an acid reaction such as, e.g. 8-chlorotheophyllin. Salts of compounds of Formula I having an oxo radical X can be precipitated, e.g. from anhydrous solutions of the bases by means of anhydrous solutions of acids and can be isolated by evaporating the dispersions so formed or also by filtering off while excluding moisture. Insofar as they are soluble in anhydrous solvents or solvents containing no hydroxyl groups, e.g. in methylene chloride, they can also be recrystallised. On contact with aqueous solvents or with air moisture, however, the salts of the corresponding hydrates are very easily obtained from the salts of such oxo compounds, i.e. compounds are obtained which contain (OH)$_2$ instead of the oxo radical X. Thus, both salts of compounds having an oxo radical X and also salts of compounds having (OH)$_2$ as X can easily be obtained, but the latter are distinguished by greater stability of the crystal form and particle size.

The following examples further illustrate the production of the new compounds without limiting the scope of the invention in any way. The temperatures are given in degrees centigrade.

Example 1

(a) 3 g. of 4,4-ethylenedioxy-piperidine and 6 g. of p-fluoro-γ-chlorobutyrophenone are refluxed for 20 hours with 5.5 g. of anhydrous potassium carbonate and 100 mg. of potassium iodide in 50 ml. of anhydrous acetone. The mixture is filtered and washed with acetone. After evaporating off the solvent, the residue is taken up in ether and extracted three times with 10% aectic acid. The combined acetic acid extracts are made alkaline with sodium carbonate solution and extracted with ether. The ethereal solution is dried with anhydrous sodium sulfate and concentrated. The 1-[4'-(p-fluorophenyl)-4'-oxo-butyl-(1')]-4,4-ethylenedioxy - piperidine (=γ - (4,4-ethylenedioxy-piperidino-p-fluorobutyrophenone) which remains as an oil is converted into the hydrochloride with the equimolar amount of ethereal hydrochloric acid and the hydrochloride is crystallized from acetone, M.P. 167–170°.

The following compounds are produced in an analogous manner via the corresponding free bases:

(b) 1-[4'-(p - fluorophenyl) - 4' - oxo-butyl]-4,4-tetramethylene - dioxy - piperidine hydrochloride, M.P. 207–208°;

(c) 1-[4'-(p-fluoro - phenyl - 4' - oxo - butyl]-4,4-(1'-methyl - trimethylene - dioxy) - piperidine hydrochloride, M.P. 201–203°;

(d) 1-[4'-(p-fluoro - phenyl) - 4' - oxo - butyl]-4,4-(2'-phenyl - trimethylene - dioxy) - piperidine hydrochloride, M.P. 231–233°;

(e) 1 - [4' - (p-fluoro-phenyl)-4'-oxo-butyl]-4,4-(2',2'-diethyl - trimethylene - dioxy)-piperidine hydrochloride, M.P. 215°;

(f) 4 - (7,16 - dioxa-3-azadispiro[5.2.5.2] hexadec-3-yl)-4'-fluoro - butyrophenone hydrochloride, M.P. 229–236°, of the formula

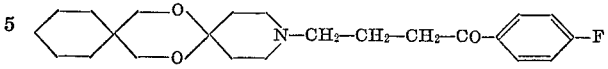

(g) 4-(1,4-dithia - 8 - azaspiro[4.5]dec - 8 - yl)-4'-fluoro-butyrophenone hydrochloride; M.P. 232–237°;

(h) 4-(1,5-dithia-9-azaspiro[5.5]undec - 9 - yl) - 4'-fluoro-butyrophenone;

(i) 4 - (6,10 - dimethyl - 1,4-dioxa-8-azaspiro[4.5]dec-8-yl)-4'-fluoro-butyrophenone, (j) 4 - (2 - methyl - 1,4-dioxa-8-azaspiro[4.5]dec-8-yl)-4'-fluoro - butyrophenone, M.P. 174–176°, and (k) 2 - methyl - 8 - [4' - (p - fluorophenyl)-4'-oxo-1'-butyl] - 1,4 - dithia - 8 - azaspiro[4.5]decane hydrochloride; M.P. 235–240°.

(l) 1 - [4' - (p - fluorophenyl) - 4'-oxo-butyl]-4,4-(2'-methyl - 2' - phenyl - trimethylenedioxy)-piperidine hydrochloride, M.P. 194–195°;

(m) 1-[4' - (p - fluorophenyl)-4'-oxo-butyl]-3-methyl-4,4-ethylenedioxy - piperidine maleate, M.P. 124°;

(n) 4-(5,12 - dioxa - 9 - azadispiro[2.2.5.2]tridec-9-yl)-4'-fluoro - butyrophenone hydrochloride, M.P. 220–221°, which is of the formula

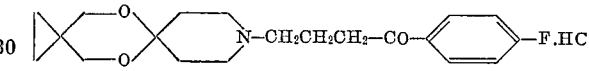

(o) 4-(1,5 - dihydro - spiro [2,4-benzodioxepin-3,4'-piperidine] - 1' - yl)-4'-fluoro-butyrophenone hydrochloride, M.P. 250–251°.

Example 2

(a) 10 g. of p-fluoro-γ-chlorobutyrophenone (produced from fluorobenzene and γ-chlorobutyric acid chloride according to Friedel-Crafts) are refluxed while stirring vigorously in a water separator, with 6.2 g. of ethylene glycol and 200 g. of p-toluene-sulfonic acid in 100 ml. of benzene. After about 24 hours, no more water separates off. The cooled emulsion is extracted with sodium carbonate solution and then washed three times with water. The organic phase is then dried with sodium sulfate, the benzene is evaporated off and the residue is distilled under high vacuum. The 1-(p - fluorophenyl)-1,1-ethylenedioxy-4-chlorobutane passes over at 88–92°/0.01 Torr.

(b) 2 - (p-fluorophenyl)-2-(3-chloropropyl)-4-methyl-m-dioxan, B.P. $_{0.001}$ 93–96° is produced in an analogous manner.

(c) The 1 - (p - fluorophenyl)-1,1-ethylenedioxy-4-chlorobutane obtained according to (a) is reacted with 4,4-ethylenedioxy - piperidine by the method described in the previous example whereupon 1-[4'-(p-fluorophenyl)-4',4'-ethylenedioxybutyl] - 4,4 - ethylene-dioxy-piperidine and its hydrochloride are obtained. The hydrochloride melts at 188–190°.

The following hydrochlorides are produced analogously via the corresponding free bases:

(d) 1-[4'-(p-fluoro-phenyl)-4',4'-ethylenedioxy-butyl]-4,4-dimethoxy-piperidine hydrochloride, M.P. 171°;

(e) 1-[4'-(p-fluorophenyl)-4',4'-(1''-methyl-trimethylene-dioxy)-1'-butyl]-4,4-ethylenedioxy - piperidine hydrochloride; M.P. 197–198°;

(f) 1-[4'-(p-fluoro-phenyl) - 4',4' - ethylenedioxy - 1' - butyl]-4,4-(1'',2'' - dimethylethylenedioxy) - piperidine hydrochloride; M.P. 206–208°;

(g) 1-[4'-(p-fluoro-phenyl)-4',4' - ethylenedioxy - 1' - butyl]-4,4-tetramethylenedioxy-piperidine hydrochloride; M.P. 207–208°;

(h) 8-[4'-(p-fluoro-phenyl)-4',4' - ethylenedioxy - 1' - butyl]-1-oxa-4-thia-8- azaspiro[4.5]decane hydrochloride, M.P. 190°;

(i) 1 - [4'-p-fluoro-phenyl) - 4',4' - ethylenedioxy - 1'- butyl]-4,4-trimethylenedioxy - piperidine hydrochloride; M.P. 174–175°;

(j) 1-[4'1(p-fluoro-phenyl)14',4' - ethylenedioxy - 1' - butyl]-4,4-(1'-methyl-trimethylenedioxy) - piperidine hydrochloride; M.P. 200–201°;

(k) 1-[4'-(p-fluoro-phenyl)-4',4' - ethylenedioxy - 1' - butyl]-4,4-(2'-butenylenedioxy)-piperidine hydrochloride; M.P. 227°;

(l) 1-[4'-(p-fluoro-phenyl)-4',4' - ethylenedioxy - 1' - butyl]-4,4-diethoxy-piperidine hydrochloride, M.P. 170–171°;

(m) 1-[4'-(p-fluoro-phenyl)-4',4' - ethylenedioxy - 1' - butyl]-4,4-(2'',2''-diethyl-trimethylenedioxy) - piperidine hydrochloride; M.P. 177°;

(n) 1-[4'-(p-fluoro-phenyl)-4',4' - ethylenedioxy - 1' - butyl]-4,4-(2''-phenyl-trimethylenedioxy) - piperidine hydrochloride; M.P. 222–225°;

(o) 1-[4'-(p-fluoro-phenyl)-4',4' - ethylenedioxy - 1' - butyl]-4,4-[3'',3''-pentamethylene) - trimethylenedioxy] - piperidine hydrochloride; M.P. 222–224°, of the formula

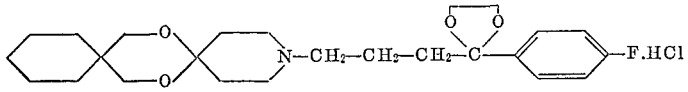

(p) 8-[4'-(p-fluoro-phenyl)-4',4' - ethylenedioxy - 1' - butyl]-1,4-dithia - 8 - azaspiro[4.5]decane hydrochloride; M.P. 218–223, and (q) 1-[4'-(p-fluoro-phenyl)-4',4'-(2'''-m-tolyl-trimethylenedioxy)-1'-butyl]-4,4-ethylenedioxy - piperidine hydrochloride.

Example 3

(a) 200 mg. of the diketal obtained according to Example 2(c) and 200 mg. of p-toluene-sulphonic acid are left to stand for about 14 hours at room temperature in 20 ml. of acetone. The acetone solution is then poured into 200 ml. of 2 N sodium carbonate solution and the mixture is extracted with ether several times. The combined ethereal solutions are washed neutral, dried with sodium sulphate and concentrated. The crude base which remains is reacted with ethereal hydrochloric acid whereupon the hydrochloride of 4-[4'-(p-fluorophenyl)-4'-oxobutyl]-4,4-ethylenedioxy-piperidine, which has already been described in Example 1, is obtained.

The following compounds are produced analogously via the corresponding free bases:

(b) 1-[4'-(p-fluoro-phenyl)-4'-oxo - 1' - butyl] - 4,4-dimethoxy-piperidine hydrochloride, M.P. 134°;

(c) 1-[4'-(p-fluoro-phenyl)-4'-oxo - 1' - butyl] - 4,4 - (1',2'-dimethylethylenedioxy) - piperidine hydrochloride, M.P. 200–202°;

(d) 8-[4'-(p-fluoro-phenyl)-4'-oxo-1' - butyl] - 1 - oxa-4-thia-8-azaspiro[4.5]decane hydrochloride, M.P. 206–208°;

(e) 1[4'-(p-fluoro-phenyl)-4' - oxo - 1' - butyl] - 4,4 - trimethylenedioxy-piperidine hydrochloride, M.P. 184–185°;

(f) 1-[4'-(p-fluoro-phenyl)-4'-oxo - 1' - butyl] - 4,4-(2'-butenylenedioxy) - piperidine hydrochloride, M.P. 205°; and (g) 1-[4'-(p-fluoro-phenyl)-4' - oxo - 1' - butyl] - 4,4 - (1',4'-dimethyl-tetramethylenedioxy) - piperidine hydrochloride, M.P. 190°.

Example 4

5 g. of 1-[4'-(p-fluorophenyl) - 4',4' - ethylenedioxy - butyl]-4,4-ethylenedioxy-piperidine hydrochloride are dissolved in 50 ml. of acetone and 3 ml. of concentrated hydrochloric acid and 3 ml. of water are added. The solution is refluxed for 30 minutes and then left to stand for about 14 hours after which it is poured into 500 ml. of 2 N sodium carbonate solution and extracted with ether. The ethereal phases are combined, dried with sodium sulphate and concentrated. The calculated amount of ethereal hydrogen chloride solution is added to the residue whereupon the hydrochloride of 1-[4'-(p-fluorophenyl)-4'-oxobutyl]-4-piperidone is obtained. It can be recrystallised from methylene chloride/ether and, in a moist atmosphere or in moist solvents, it is transformed into the monohydrate hydrochloride, i.e. into 1-[p-fluorophenyl)-4'-oxobutyl]4,4-dihydroxy-piperidine hydrochloride. The latter melts at 177°.

The hydrochloride mentioned is obtained in the same way from the monoketal mentioned in Example 1.

Example 5

200 mg. of the monohydrate hydrochloride obtained according to Example 4 are dissolved in 10 ml. of abs. ethanol and the solution is acidified with 1 drop of ethanolic hydrochloric acid. The solution is concentrated in vacuo to about half its volume. After adding ether and petroleum ether, the hydrochloride of 1-[4'-(p-fluorophenyl)-4'-oxobutyl]-4,4-diethoxy - piperidine (=γ-(4,4-diethoxy-piperidino)-p-fluorobutyrophenone) crystallizes out; M.P. 168°.

Example 6

(a) 30 g. of 4,4-dihydroxy-piperidine hydrochloride, 20 g. of 2,3-butane-diol and 1 g. of p-toluene-sulfonic acid in 500 ml. of benzene are boiled while stirring vigorously in a water separator. When no more water passes over, the benzene is decanted and 100 ml. of 50% potassium carbonate solution and 200 ml. of chloroform are added, while stirring, to the residue. After removal of the chloroform phase, the aqueous phase is extracted three times with chloroform. The combined chloroform phases are washed with water, dried with sodium sulfate and concentrated. The 4,4-(1',2'-dimethylethylenedioxy)-piperidine which remains is distilled under water jet vacuum. B.P. 96–97°/11 Torr.

In the same way, on reacting 4, 4-dihydroxy-piperidine with 1,4-butane diol, 4,4-tetramethylene dioxy-piperidine (B.P. 113–115°/11 Torr), and upon reacting the aforesaid piperidine with cis-1,2-cyclohexane diol, 4,4-(1,2-cis-cyclohexylenedioxy)-piperidine (B.P. 128–130°/10 Torr) are produced; there are also prepared in an analogous manner:

2 - methyl - 1,5 - dioxa - 9 - azaspiro[5.5]undecane, B.P.$_{10}$=107°; 1,5 - dioxa - 9 - azaspiro - [5.5]undecane, B.P.$_{12}$=114°; 1 - oxa - 4 - thia - 8 - azaspiro[4.5]decane, B.P.$_{10}$=116–119°; 7,12 - dioxa - 3 - azaspiro[5.6]dodec-9 - ene, B.P.$_{12}$=128°; and 8,11 - dimethyl - 7,12 - dioxa-3-azaspiro[5.6]dodecane, B.P.$_{12}$=119–120°.

(b) On reacting the ketals described in (a) with equimolar amounts of p-fluoro-γ-chlorobutyrophenone analogously to Example 1, 1-[4'-(p-fluoro-phenyl)-4'-oxobutyl] - 4,4 - (1'',2'' - dimethyl - ethylenedioxy) - piperidine, 1-[4' - (p - fluoro - phenyl) - 4' - oxobutyl] - 4,4-tetramethylenedioxy - piperidine and 1 - [4' - (p - fluorophenyl) - 4' - oxobutyl] - 4,4 - (1'',2'' - cis - cyclohexylenedioxy)-piperidine as well as their hydrochlorides are obtained.

Example 7

5 g. of 3,3-ethylenedioxy-pyrrolidine (prepared from 1-carbethoxy-3,3-ethylenedioxy-pyrrolidine by refluxing in 1 N bariumhydroxide) and 9 g. of p-fluoro-γ-chlorobutyrophenone are refluxed for 20 hours with 10 g. of anhydrous potassium carbonate and 200 mg. of potassium iodide in 50 ml. of anhydrous pentanone-3.

The mixture is filtered and washed with pentanone-3. After evaporating off the solvent, the residue is taken up in ether and extracted three times with 10% acetic acid. The combined acetic acid extracts are made alkaline with sodium carbonate solution and extracted with ether.

The ethereal solution is dried with anhydrous sodium sulfate and concentrated. The 1-[4'-fluorophenyl)-4'-oxobutyl] - 3,3 - ethylenedioxy - pyrrolidine (=γ - 3,3-ethylenedioxy - pyrrolidino) - p - fluorobutyrophenone) which remains as an oil is converted into the hydrochloride with equimolar amount of ethereal hydrochloric acid and the hydrochloride is crystallized from methanol-ether; M.P. 145°.

The following compounds are produced in an analogous manner:

(b) 1 - [4' - (p - fluoro - phenyl) - 4' - oxo - butyl]-4,4-tetramethylene-dioxo-pyrrolidine hydrochloride;

(c) 1 - [4' - (p - fluoro - phenyl) - 4' - oxo - butyl] - 4,4-(1' - methyl - trimethylene - dioxy) - pyrrolidine hydrochloride;

(d) 1 - [4' - (p - fluoro - phenyl) - 4' - oxo - butyl]-4,4 - (2' - phenyl - trimethylene - dioxy) - pyrrolidine hydrochloride;

(e) 1 - [4' - (p - fluoro - phenyl) - 4' - oxo - butyl] - 4,4-(2',2' - diethyl - trimethylene - dioxy) - pyrrolidine hydrochloride;

(f) 4 - (6,15 - dioxa - 2 - azaspiro[4.2.5.2.]pentadec-2-yl)-4'-fluoro-butyrophenone hydrochloride of the formula

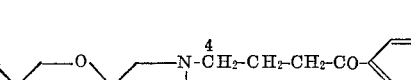

(g) 4 - (6,9 - dithia - 2 - azaspiro[4.4]non - 2 - yl) - 4'-fluoro-butyrophenone hydrochloride; and (h) 4 - (6,10 - dithia - 2 - azaspiro[4.5)dec - 2 - yl - 4'-fluoro-butyrophenone.

Example 8

6 g. of 1-(p-fluorophenyl)-1,1-ethylenedioxy-4-chlorobutane obtained according to Example 2(a) is reacted with 3 g. of 4,4-ethylenedioxy-aza-cycloheptane(4',4'-ethylenedioxy-hexahydroazepine) by the method described in Example 7 whereupon 1-[4'-(p-fluorophenyl)-4',4'-ethylenedioxy - butyl] - 4,4 - ethylene - dioxy - aza - cycloheptane is obtained; M.P. 149–150°.

The following compounds are produced analogously:

1 - [4' - (p - fluoro - phenyl) - 4' - (1" - methyl - trimethylene - dioxy) - 1' - butyl] - 4,4 - ethylenedioxyazacycloheptane hydrochloride, 1 - [4' - (p - fluoro - phenyl) - 4',4' - ethylenedioxy - 1'-butyl] - 4,4 - (1",2" - dimethylethylenedioxy) - azacycloheptane hydrochloride, 1 - [4' - (p - fluoro - phenyl) - 4',4' - ethylenedioxy - 1'-butyl] - 4,4 - tetramethylenedioxy - azacycloheptane hydrochloride, 8 - [4' - (p - fluoro - phenyl) - 4',4' - ethylenedioxy - 1'-butyl] - 1 - oxa - 4 - thia - 8 - azaspiro[4.6]undecane hydrochloride, 1 - [4' - (p - fluoro - phenyl) - 4',4' - ethylenedioxy - 1'-butyl] - 4,4 - trimethylenedioxy - azacycloheptane hydrochloride, 1 - [4' - (p - fluoro - phenyl) -4',4' - ethylenedioxy - 1'-butyl] - 4,4 - (1' - methyl - trimethylenedioxy) - azacycloheptane hydrochloride, 1 - [4' - (p - fluoro - phenyl) - 4',4' - ethylenedioxy-1' - butyl] - 4,4 - (2' - butenylenedioxy) - azacycloheptane hydrochloride, 1 - [4' - (p - fluoro - phenyl) - 4',4' - ethylenedioxy-1' - butyl] - 4,4 - diethoxy - azacycloheptane hydrochloride, 1 - [4' - (p - fluoro - phenyl) - 4,4' - ethylenedioxy-1' - butyl] - 4,4 - (2",2" - diethyl - trimethylenedioxy)-azacycloheptane hydrochloride, 1 - [4' - (p - fluoro - phenyl) - 4',4' - ethylenedioxy - 1'-butyl] - 4,4 - (2" - phenyl - trimethylenedioxy) - azacycloheptane hydrochloride, and 1 - [4' - (p - fluoro - phenyl) - 4',4' - ethylenedioxy - 1'-butyl] - 4,4[2",2" - pentamethylene) - trimethylenedioxy]-azacycloheptane hydrochloride of the formula

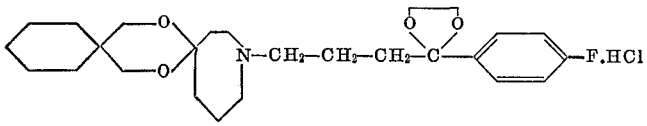

Example 9

20 g. of 4,4-dihydroxy-piperidine-hydrochloride are boiled at reflux in 500 ml. of methanol containing 5 ml. of concentrated sulfuric acid, for 12 hours. The solution is adjusted to an alkaline pH-value by addition of anhydrous sodium carbonate and evaporated. The resulting 4,4-dimethoxy-piperidine is separated by distillation. M.P. 75° C. at 10 Torr.

Dosage units for peroral application contain, as active substance, preferably between 1% and 90% of a compound of general Formula I or a non-toxic salt thereof. To produce such dosage units, an active substance according to the invention is combined, for example, with solid, pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycols (carbowaxes) of suitable molecular weight, to form tablets or cores for sugar coated tablets (dragées). The latter are coated, for example, with concentrated sugar solutions which can also contain, for example, gum arabic, talcum and/or titanium dioxide, or with a lacquer dissolved in easily volatile organic solvents or mixtures of solvents. Dyestuffs can be added to these coatings, e.g. to differentiate between varying contents of active substance. Soft gelatine capsules and other closed capsules consist, for example, of a mixture of gelatines and glycerin and contain, for example, mixtures of the active substance with carbowax, and hard gelatine capsules contain, e.g. granulates of an active substance according to the invention with solid, pulverulent carriers such as, e.g. lactose, saccharose, sorbitol, mannitol; starches such as potato starch, maize starch or amylopectin, cellulose derivatives or gelatines and also magnesium stearate or stearic acid. Suppositories are used, for example, as dosage units for rectal application. These consist of a combination of an active substance according to the invention with a neutral fatty base, or also of gelatine rectal capsules which consist of a combination of the active substance with polyethylene glycols (carbowaxes) of suitable molecular weight.

Ampoules for parenteral, particularly intramuscular application, preferably contain a water soluble salt of an active substance according to the invention in a concentration of, preferably, 0.5–5%, together with suitable stabilizing agents and, optionally, buffer substances, in aqueous solution.

The following examples describe the production of three typical forms of application for oral use, but the invention is in no way limited thereto.

Example 10

250 g. of active substance, e.g. 1-[4'-(p-fluorophenyl)-4'-oxobutyl] - 4,4-ethylenedioxy-piperidine hydrochloride, are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 250 g. of magnesium stearate and 32 g. of colloidal silicium dioxide are mixed in and the mixture is pressed into 10,000 tablets each weighing 100 mg. and containing 25 mg. of active substance. If desired, the

19 tablets can be grooved to attain better adaptation of the dosage.

Example 11

A granulate is produced from 250 g. of active substance, 175.90 g. of lactose and the alcoholic solution of 10 g. of stearic acid. After drying, 56.60 g. of colloidal silicium dioxide, 165 g. of talcum, 20 g. of potato starch and 2.50 g. of magnesium stearate are mixed in and the whole is pressed into 10,000 dragée cores. These are then coated with a concentrated syrup made from 502.28 g. of crystallized saccharose, 6 g. of Shellack, 10 g. of gum arabic, 0.22 g. of dyestuff and 1.5 g. of titanium dioxide and dried. Each of the dragées obtained weighs 120 mg. and contains 25 mg. of active substance.

Example 12

250 g. of active substance are well mixed with 442.8 g. of potato starch and 295.2 g. of lactose, the mixture is moistened with an alcoholic solution of 30.0 g. of stearic acid and granulated through a sieve. After drying, this granulate is mixed with 96.0 g. of talcum, 80.0 g. of potato starch and 6.0 g. of magnesium stearate and the mixture obtained is again granulated through a sieve. This granulate serves as filling for 10,000 hard gelatine capsules each weighing 120 mg., and each of the capsules so obtained contains 25 mg. of active substance.

We claim:

1. A compound of the formula

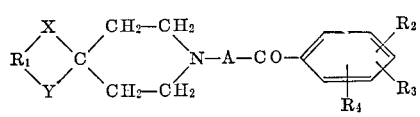

(I)

wherein each of
X and Y represents oxygen or sulfur,
$R_1$ represents a divalent hydrocarbon radical having from 2 to 11 carbon atoms, which radical links X and Y by way of from 2 to 4 carbon atoms and is free from unsaturated bonds at the two terminal carbon atoms,
each of
$R_2$, $R_3$ and $R_4$ independently of the others represents hydrogen, lower alkyl, lower alkoxy or chlorine and, when $R_4$ is hydrogen, $R_2$ and $R_3$ also represent the methylenedioxy radical, and
A represents an alkylidene or alkylene radical, having at most 4 carbon atoms, or a pharmaceutically acceptable addition salt thereof with an acid.

2. A compound as defined in claim 1 which is 4-(2-methyl - 1,5 - dioxa-9-azaspiro[5,5]undec-9-yl)-4'-isopropylbutyrophenone.

3. A compound as defined in claim 1 which is 4-(7,12-dioxa-3-azaspiro[5,6]dodec-3-yl) - 4' - isopropylbutyrophenone.

4. A compound as defined in claim 1 which is 4-(1,4-dioxa-8-azaspiro[4,5]dec-8-yl)-butyrophenone.

5. A compound as defined in claim 1 which is 4-(3-phenyl - 1,5 - dioxa - 9 - azaspiro[5,5]undec-9-yl)-butyrophenone.

6. A compound as defined in claim 1 which is 4-(1-oxa-4-thia-8-azaspiro[4,5]dec-8-yl)-4'-chloro-butyrophenone.

7. A compound as defined in claim 1 which is 4-(1,4-dithia-8-azaspiro[4,5]dec-8-yl)-4'-chloro-butyrophenone.

8. A compound of the formula

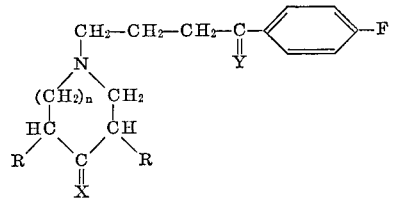

20 or a pharmaceutically acceptable addition salt thereof with an acid, in which formula:

is a divalent radical selected from the group consisting of

and

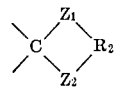

in which
each of $Z_1$ and $Z_2$ is a member selected from the group consisting of oxygen and sulfur,
$R_2$ represents a divalent hydrocarbon radical of from 2 to 10 carbon atoms from 2 to 4 of which are straight-enchained between $Z_1$ and $Z_2$ so as to form an aliphatic bridge therebetween;

is a divalent radical selected from the group consisting of the groupings

and

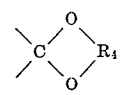

wherein $R_4$ represents alkylene of from 2 to 4 carbon atoms;
R represents a member selected from the group consisting of hydrogen and lower alkyl; and
n is an integer ranging from 0 to 2.

9. A compound as defined in claim 8 which is 1-[4'-(p-fluorophenyl)-4'-oxobutyl-(1')]-4,4-ethylenedioxy piperidine.

10. A compound as defined in claim 8 which is 1-[4'-(p - fluorophenyl)-4'-oxobutyl]-4,4-(2'-phenyl-trimethylene-dioxy)-piperidine.

11. A compound as defined in claim 8 which is 4-(1,5-dihydro-spiro[2,4-benzodioxepin-3,4'-piperidine] - 1' - yl)-4'-fluorobutyrophenone.

12. A compound as defined in claim 8 which is 1-[4'-(p-fluorophenyl)-4'-oxobutyl-(1')] - 4,4 - tetramethylenedioxy-piperidine.

13. A compound as defined in claim 8 which is 1-[4'-(p - fluorophenyl) - 4' - oxobutyl-(1')]4,4-(1'-methyl-trimethylene-dioxy)-piperidine.

14. A compound as defined in claim 8 which is 1-[4'-(p-fluorophenyl)-4'-oxobutyl - (1')]-4,4 - (1',2'-dimethylethylene-dioxy)-piperidine.

15. A compound as defined in claim 8 which is 1-[4'-(p-fluorophenyl)-4'-oxobutyl - (1')]-4,4-trimethylene-dioxy-piperidine.

16. A compound as defined in claim 8 which is of the formula

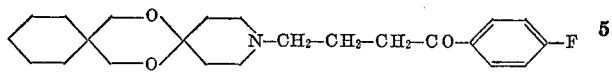

17. A compound as defined in claim 8 which is 4-(1,4-dithia-8-azaspiro[4,5]dec-8-yl)-4′-fluoro-butyrophenone.

18. A compound as defined in claim 8 which is 1-[4′-(p-fluorophenyl)-4′-oxobutyl-(1′)]-3,3-ethylenedioxy pyrrolidine.

19. A compound of the formula

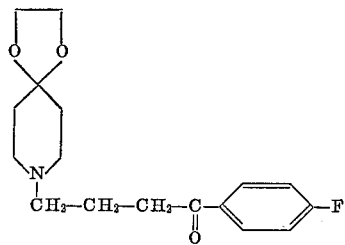

or an acid addition salt thereof with a pharmaceutically acceptable acid.

20. A compound of the formula

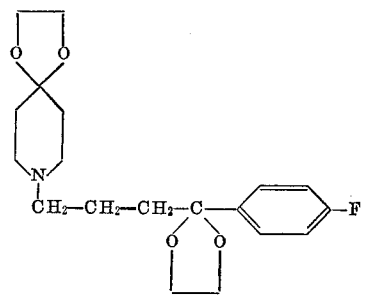

or an acid addition salt thereof with a pharmaceutically acceptable acid.

References Cited
UNITED STATES PATENTS

| | | | |
|---|---|---|---|
| 3,074,952 | 1/1963 | Casy et al. | 260—294.75 |
| 3,080,372 | 3/1963 | Janssen | 260—294.75 |
| 3,209,006 | 9/1965 | Wragge et al. | 260—294.75 |

FOREIGN PATENTS

No. 1459M   8/1962   France.

JAMES A. PATTEN, *Primary Examiner.*

U.S. Cl. X.R.

260—239, 256, 294, 294.7, 326.5, 327, 340.3, 340.7, 340.9; 424—256, 267